W. J. KENNEY & H. P. GROHN.
SELF CLEANING STOKER.
APPLICATION FILED DEC. 20, 1913.

1,172,292.

Patented Feb. 22, 1916.
5 SHEETS—SHEET 1.

W. J. KENNEY & H. P. GROHN.
SELF CLEANING STOKER.
APPLICATION FILED DEC. 20, 1913.
1,172,292.
Patented Feb. 22, 1916.
5 SHEETS—SHEET 2.
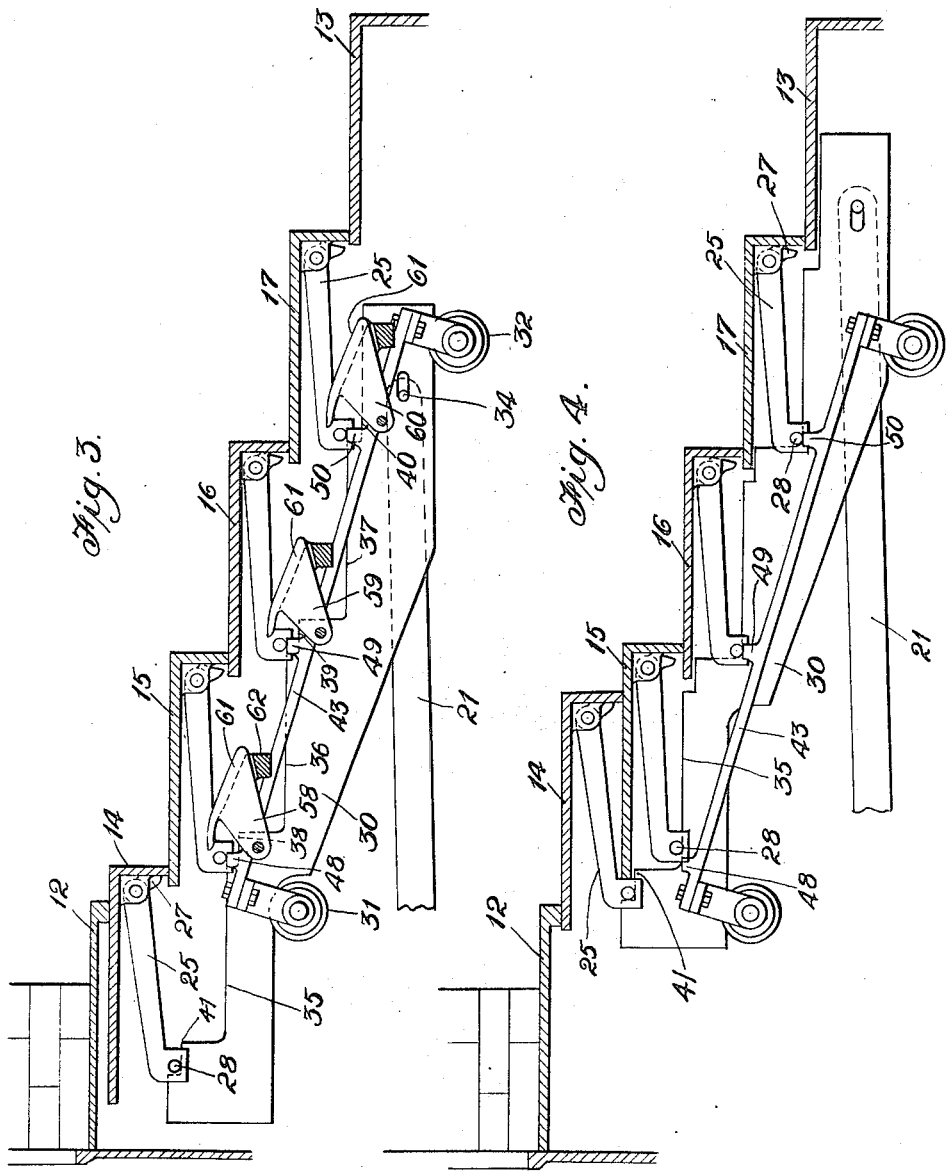

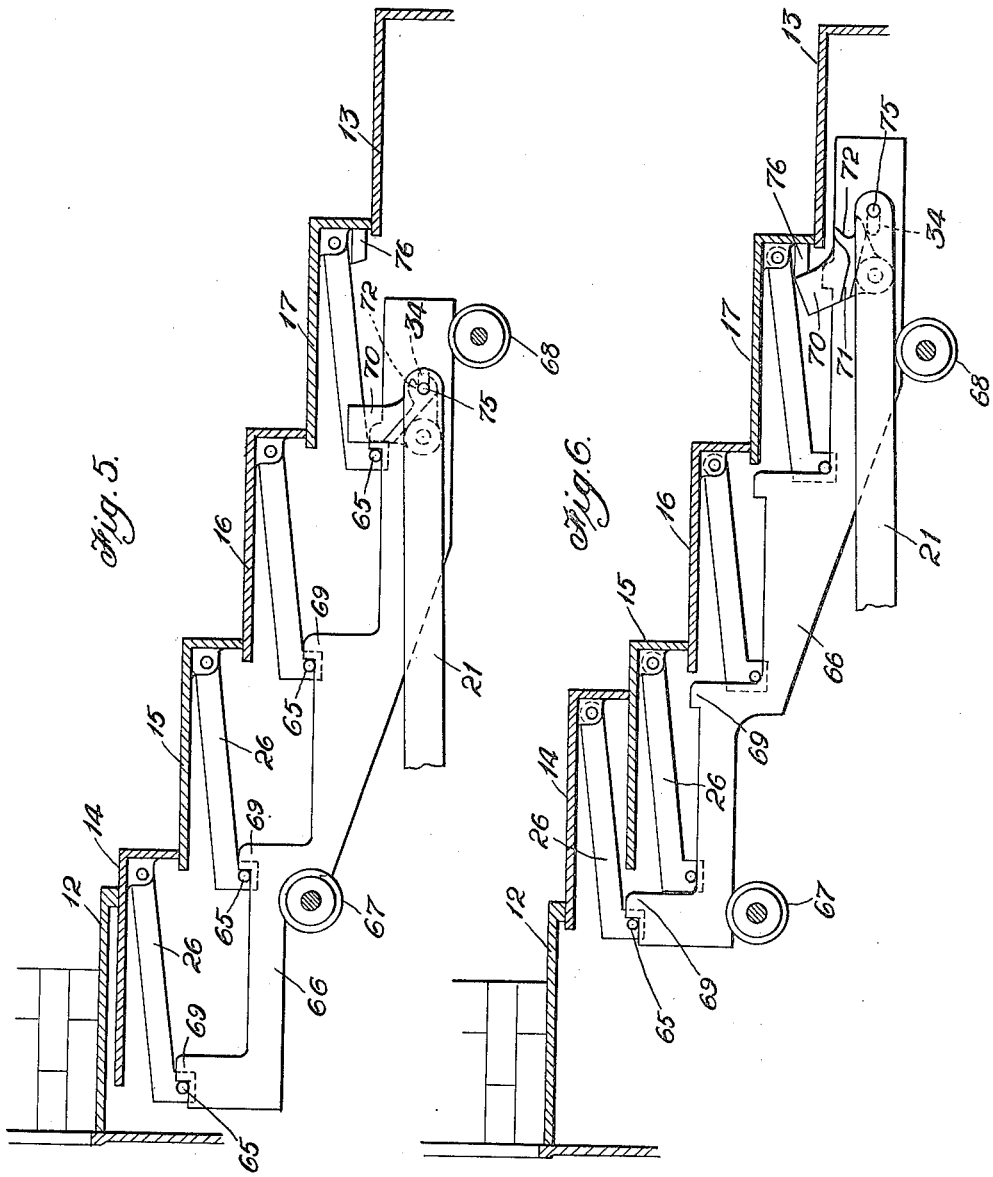

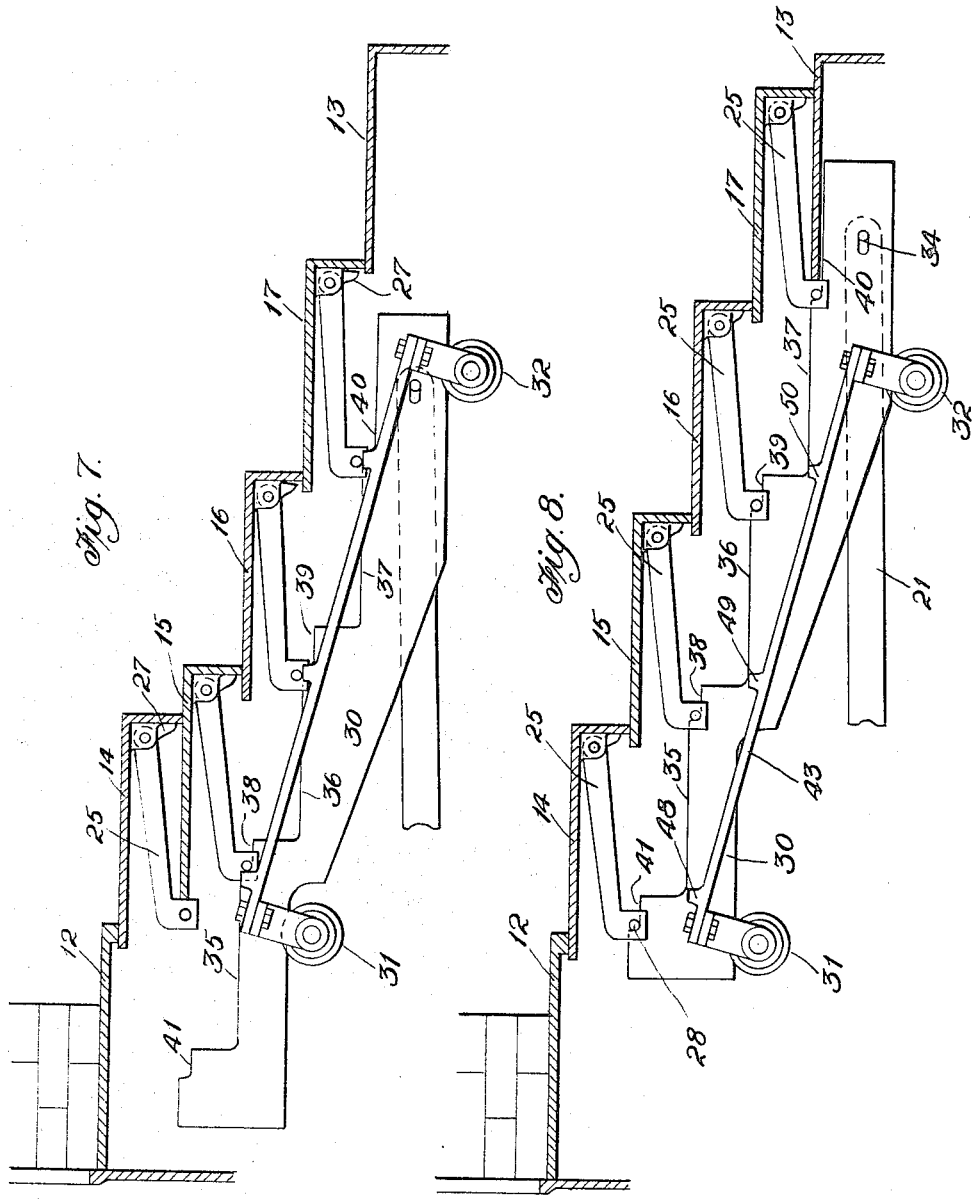

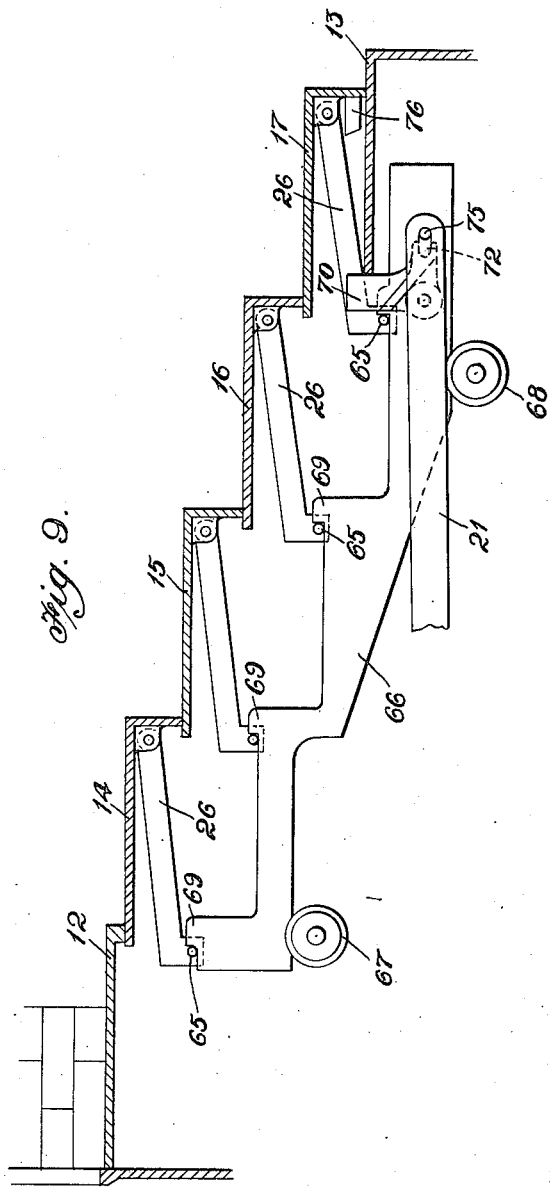
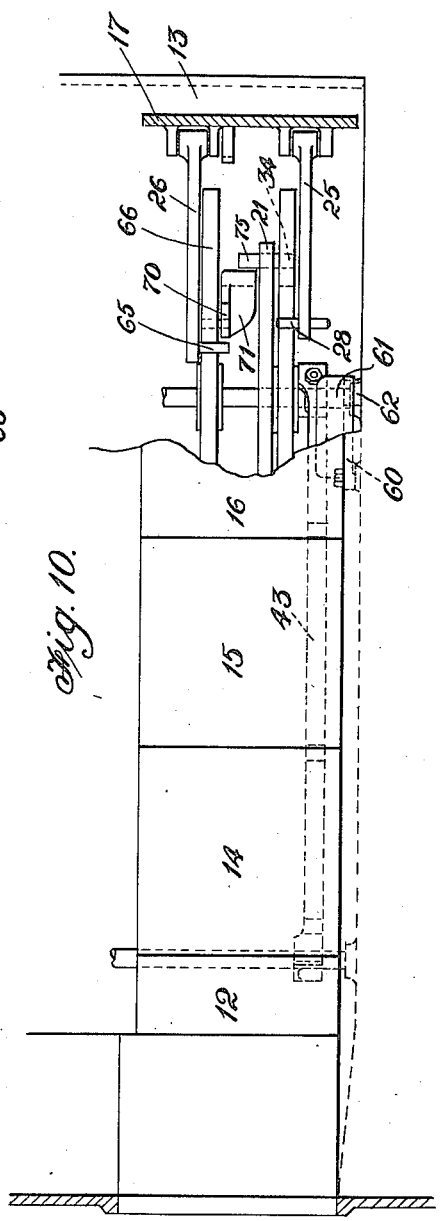

UNITED STATES PATENT OFFICE.

WILLIAM JOHN KENNEY, OF WILMETTE, AND HENRY PHILLIP GROHN, OF CHICAGO, ILLINOIS, ASSIGNORS TO UNDER-FEED COMPANY OF AMERICA, OF CHICAGO, ILLINOIS, A CORPORATION OF NEW JERSEY.

SELF-CLEANING STOKER.

1,172,292.   Specification of Letters Patent.   Patented Feb. 22, 1916.

Application filed December 20, 1913. Serial No. 807,828.

*To all whom it may concern:*

Be it known that we, WILLIAM J. KENNEY and HENRY P. GROHN, citizens of the United States, residing at Wilmette and Chicago, respectively, county of Cook, State of Illinois, have invented a certain new and useful Improvement in Self-Cleaning Stokers, and declare the following to be a full, clear, and exact description of the same, such as will enable others skilled in the art to which it pertains to make and use the same, reference being had to the accompanying drawings, which form a part of this specification.

The present invention relates to automatic stokers, particularly under-feed stokers and has for its object to produce a simple and efficient arrangement for cleaning the furnace of the clinkers and ashes.

Figure 1:
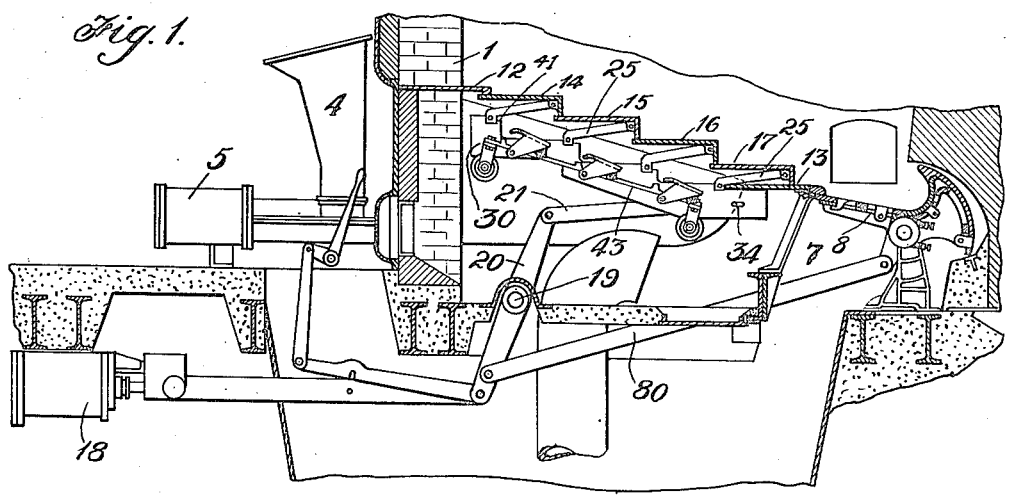
Figure 2:
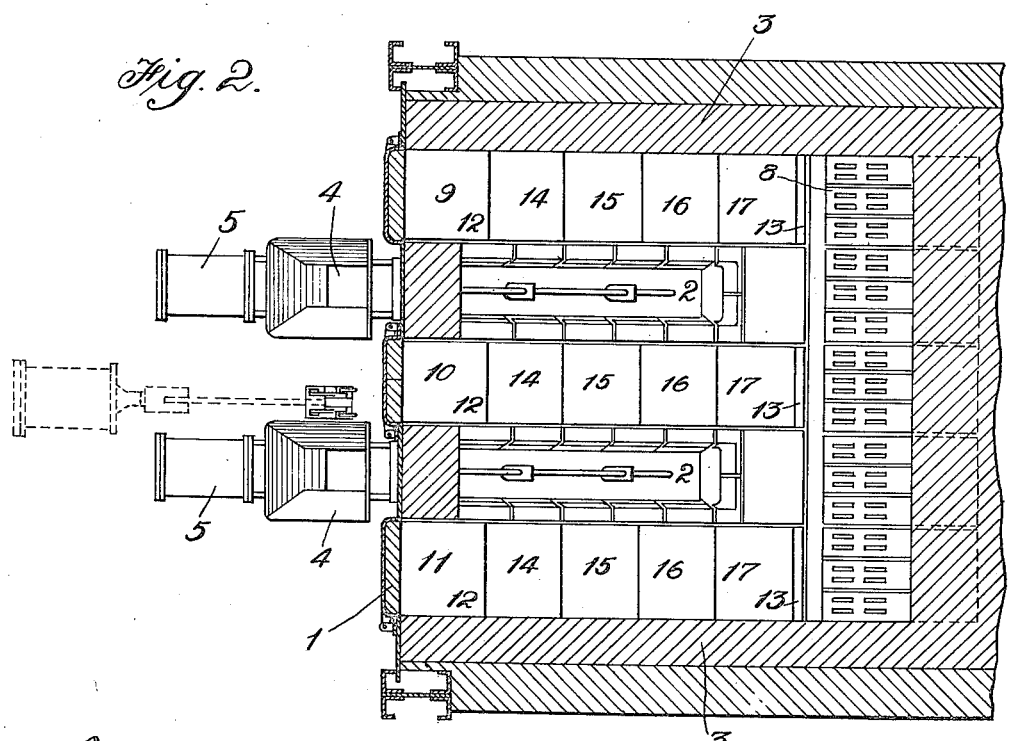

The various features of novelty whereby the present invention is characterized will hereinafter be pointed out with particularity in the claims; but, for a full understanding of the present invention and of its object and advantages, reference may be had to the following detailed description taken in connection with the accompanying drawings, wherein:

Figure 1 is a vertical section through a furnace equipped in accordance with the present invention; Fig. 2 is a horizontal section taken through the furnace above the fuel supports and retorts; Fig. 3 is a section on an enlarged scale through one section of the cleaning apparatus; Fig. 4 is a view similar to Fig. 3 showing some of the parts in different positions than in Fig. 3; Figs. 5 and 6 are views corresponding to Figs. 3 and 4 taken in a different vertical plane than Figs. 3 and 4; Figs. 7 and 8 are views similar to Figs. 3 and 4, showing still different positions of the parts; Fig. 9 is a view similar to Figs. 5 and 6 with the parts in the positions corresponding to Fig. 8; and Fig. 10 is a top plan view of one section of the cleaning apparatus on the same scale as Figs. 3 to 9, a portion of the fuel-supporting surface being broken away to show the underlying mechanism.

Referring to Figs. 1 and 2 of the drawings, 1 represents a furnace having therein two retorts, 2, 2, separated from each other and from the side walls, 3, of the furnace. Each retort is adapted to be supplied with fuel fed into it from a hopper, 4, by means of a ram, 5.

All of the foregoing parts are old and well known and the particular forms illustrated are simply intended to be conventional illustrations. Furthermore, the present invention is not concerned with the number of retorts in a furnace, being applicable to any desired number of retorts.

Behind the retorts is a discharge passage, 7, through which the clinkers and ashes resulting from combustion are adapted to be dropped. In the arrangement shown the inlet end of the discharge passage is controlled by an automatic dumping plate, 8.

In the operation of under-feed stokers the fuel is coked and then consumed as it rises to the top of the retorts and the clinkers and ashes, together with some combustible matter, wells over the sides of the retorts where they are either collected on dead plates from which the clinkers and ashes must periodically be removed by hand, or they are received by automatic cleaning mechanism which feeds them slowly toward the discharge passage and causes them to be dicharged from the furnace when the combustible matter has been consumed as nearly as possible.

The present invention has to do with automatic apparatus for receiving the hot masses flowing out of the retorts and feeding them to the discharge passage so as automatically to keep the furnace clean. To this end there is placed on each side of each retort a stepped dead plate the sections of which are movable forwardly and rearwardly so as gradually to feed the overlying mass of material to the discharge passage. In the arrangement shown, where there are two retorts, there are three panels of sectional dead plates indicated at 9, 10 and 11, respectively, two of the panels lying between the retorts and the sides of the furnace and the third panel lying between the two retorts. In the arrangement shown, each panel is made of stationary end sections, 12 and 13, and movable intermediate sections, 14, 15, 16 and 17. It will of course be understood that the number of movable sections may be varied at will according to the size of the furnace and other service conditions.

The movable sections of each panel are actuated through connections to be hereinafter described from any suitable source of power; there being in the arrangement shown a steam cylinder, 18, adapted to actuate a rock shaft, 19, having below each of the fuel-supporting panels an arm, 20, to which one end of an actuating bar, 21, is connected. It will be seen that when the rock shaft is oscillated the several arms, 21, will be caused to reciprocate.

Each of the movable sections of a panel is made L-shaped in longitudinal section so as to comprise a horizontal upper member and a depending member at the rear edge, the depending member of each section engaging with the horizontal portion of the section behind it so as to form a continuous stepped surface from the front to the rear of the panel. On the under side of each of the movable sections are pivoted two arms, 25 and 26, the pivotal connection between the arms and the sections being near the upper rear corners so as to leave the ends of the arms nearest the front of the furnace free. Each of these arms 25 is provided at its pivotal end with a nose or projection, 27, which is adapted to engage with the vertical portion of the step so as to limit the downward swinging movement. Near the free end of each of the arms 25 is a laterally projecting pin, 28, extending in both directions from the arm. One end of each of the pins 28 is adapted to be engaged by an actuating plate, 30, which serves to move the sections toward the rear. Each actuating plate, 30, is mounted upon guides, preferably rollers as indicated at 31 and 32, suitably supported on stationary portions of the structure. The rear end of each actuating plate is connected to one of the actuating bars 21 by a pin and slot connection, 34, which provides a limited lost motion between the members 21 and 30. In the arrangement shown, it is the intention that the sections of each panel be moved rearwardly one at a time, the section 14 being moved first, and the sections 15, 16 and 17 following in succession; a complete movement of the members 21 and 30 in the rearward direction being required for each movement of one of the sections. To accomplish this, the upper edge of the actuating plate is formed in steps as indicated at 35, 36 and 37 corresponding respectively to the sections 15, 16 and 17. At the rear end of each of the steps 35, 36 and 37 is a short lower step as indicated at 38, 39 and 40. At the front end of the member 30 is a short step, 41. Whenever one of the pins 28 lies upon one of the short steps in the member 30, a rearward movement of the actuating member 30 will carry the corresponding section of the panel rearwardly and, when the actuating member returns to the other limit of its movement, the pin simply drops from the step and the section of the panel remains in the position into which it has been carried. In order to make the sections of a panel move in succession it is necessary to bring each of the pins 28 into engagement with its actuating step on the member 30 at the proper time and hold it away from the step at other times. To accomplish this there is arranged beside the actuating member 30 a stationary bar, 43, having a series of upward projections 48, 49 and 50 lying directly opposite the short steps 38, 39 and 40 when the actuating member 30 is in its forward position; the tops of the projections 48, 49 and 50 being at least as high as the upper edges of the long steps 35, 36 and 37 respectively.

When all of the sections of a panel are retracted, that is are at the forward limit of their movement, the pin 28 corresponding to the section 14 rests on the short step 41 while the pins corresponding to the other three sections rest upon the projections 48, 49 and 50, respectively. Thus the actuating member 30 may be moved rearwardly and carry the section 14 rearwardly without disturbing the other three movable sections. This condition of the parts is illustrated in Fig. 3. When it is desired to set the cleaning mechanism in operation, the rock shaft 19 is actuated so as to reciprocate the actuating bars 21. As each bar 21 moves rearwardly it carries the corresponding actuating member 30 with it and, since the member 30 is in operative relation to the pin on the actuating arm of the section 14, this section will be carried toward the rear as indicated in Fig. 4. The stroke of the actuating member 30 is such that just before the section 14 reaches the limit of its movement the rear end of its arm 25 engages with the rear edge of the horizontal portion of the section or step 15 and causes the latter to move rearwardly a distance sufficient to carry the pin 28 from above the stationary projection 48, leaving the pin 28 supported on the long stepped portion 35; this being the condition of the parts illustrated in Fig. 4. When the actuating member 30 reaches the end of its rearward movement it starts forward again and finally reaches the limit of its forward movement as illustrated in Fig. 7. At the beginning of the forward movement of the member 30 the step 41 rides out from beneath the pin 28 on the actuating arm of the section 14 so as to leave this section in the position into which it has been carried. As the member 30 approaches the limit of its forward movement the pin 28 on the actuating arm of the section 15 drops down from the long step 35 and falls upon the short step 38 as indicated in Fig. 7. Consequently, when the actuating member 30 starts to move backward it carries the section 15 with it, this section in turn causing section 16 to be placed in operative relation to the actuating member so that on the third rearward movement of the actuating member the section 16 will be moved. In the same way, the rearward movement of the member 16 connects the member 17 so that on the fourth rearward movement of the actuating member the member 17 will be carried toward the rear, leaving the parts in the positions indicated in Fig. 8.

When the sections of a panel, after having been moved to the rear, are carried forwardly again, it is necessary to bring the pins 28 of the sections 15, 16 and 17 upon the stationary projections 48, 49 and 50 so as to place the mechanism in condition to perform another cycle in which one section after another is carried toward the rear. In the arrangement shown, this is accomplished by the devices best disclosed in Figs. 3 and 10. Just behind each of the projections 48, 49 and 50 is pivoted a gravity dog as indicated at 58, 59 and 60, each dog having at its upper end a laterally-projecting inclined flange or web, 61. Normally the free ends of the dogs rest on stationary lugs or projections 62 carried by any suitable stationary part of the structure. The parts are so proportioned that as each of the sections 15, 16 and 17 moves rearwardly, the corresponding pin 28 rides under the corresponding gravity dog, raising the dog and allowing it to drop back to its normal position after having passed it. On the return of the movable sections 15, 16 and 17, the pins 28 ride up over the tops of the flanges 61 of the dogs and drop from the front ends thereof upon the stationary projections 48, 49 and 50.

The means for returning the movable sections of a panel to their forward positions is best illustrated in Figs. 5, 6, 9 and 10. As heretofore explained, each of the movable sections of the panel has pivoted beneath the same, in addition to the arm 25, a second arm 26. On the forward free end of each of the arms 26 is a laterally-projecting pin, 65. These pins rest upon a stepped return plate, 66, movable on rollers, 67 and 68, corresponding to the rollers 31 and 32 on which the actuating member 30 rests. At the rear end of each of the steps in the member 66 is an upward projection, 69, engaging with the corresponding pin 65 so that when the member 66 is moved forwardly from the rearward limit of its movement, it carries all of the movable sections of the panel forwardly at the same time. In Fig. 5 the parts are illustrated in a position corresponding to the position of the parts in Fig. 3 and it will be seen that as the actuating member 30 is moved rearwardly from the position indicated in Fig. 3 to that indicated in Fig. 4, the pin 65 on the front end of the arm 26 carried by the section 14 will engage with the corresponding lug or projection, 69, so as to carry the return member 66 rearwardly, leaving the parts in the positions indicated in Fig. 6. It is necessary that the member 66 be left at the rearward limit of its movement until all of the sections have been pushed back because any forward movement of the return member 66 will move forwardly all of those sections which at that time have been shifted toward the rear. In order to leave the member 66 at the rearward limit of its movement until the last of the sections of the panel has been shifted rearwardly, there is provided a clutch device which will connect the member 66 with the actuating bar 21 only after the section 17 has been shifted. In the arrangement shown, this clutch device comprises a gravity dog, 70, pivotally connected at its front end to the rear end of the member 66 and having a laterally-projecting flange or web, 71, inclined downwardly from the front toward the rear and lying in proximity to the actuating bar 21. On the rear end of the dog 70 is a transverse seat, 72. On the rear end of the actuating bar 21 is a laterally-projecting pin, 75, in position to engage with the seat 72 and cause the member 66 to move forwardly with the actuating bar. On the rear side of the vertical member of the section 17 of the panel is a finger, 76, which, when the return plate is moved from the position indicated in Fig. 5 to that indicated in Fig. 6 strikes the upper end of the dog 70 and swings it around so as to carry the seat 72 up above the pin 75 on the actuating bar. It will be seen that while the pin 75 fits snugly in the seat 72 during the forward movement which returns all of the movable sections to their forward positions, the pin and slot connection 34 between the actuating bar and the actuating member 30 permits the pin 75 to travel away from the seat 72 at the beginning of the rearward movement, so that the pin 75 does not interfere with the swinging of the dog when the latter strikes the finger 76. Consequently, upon the first rearward movement of the actuating bar 21 to move the section 14 of a panel rearwardly, the return bar 66 is carried rearwardly and is automatically unclutched from the actuating bar so that thereafter the actuating bar is free to reciprocate without moving the return member 66. However, when the last of the movable sections, 17, is carried rearwardly, the finger 76 thereon is carried away from the dog 70 and the latter is again thrown into its clutching position by gravity assisted by the pin 65 on the return arm 26 of the section 17; the pin 65 projecting laterally far enough to engage with the dog 70 when the section 17 is moved rearwardly. Consequently when all of the sections of the panel have been shifted toward the rear as indicated in Fig. 8, and explained heretofore, the return mechanism is in the condition shown in Fig. 9, the seat 72 on the dog 70 lying directly in front of the pin 75. Therefore, as the lost motion is taken up between the actuating bar 21 and the actuating plate 30, the pin 75 reaches the seat 72 in the dog 70 and the plate 66 is thereafter carried forwardly, carrying with it all of the movable sections of the panel.

The parts being returned by the return member 66 to the positions indicated in Figs. 3 and 5, the entire cycle of operations may be repeated, this process continuing as long as may be desired. It will thus be seen that the entire stepped panel is carried bodily in the direction of its length by a progressive shifting of its sections so that the clinkers and ashes farthest from the discharge passage are moved toward the discharge passage a step at a time and are joined by other masses which have not so far to travel. By shifting one section at a time the movement of the waste masses is made positive, the masses are broken up and the feed may be nicely regulated.

The dumping plate 84 may be actuated from the rock shaft 19 through a suitable connection, 80, so that the dumping of the clinkers and ashes may be properly regulated in accordance with the rate at which the clinkers and ashes are being fed toward it; making it possible to allow the clinkers and ashes to pile up to any desired extent on the dumping plate before being discharged, or else allowing the clinkers and ashes to be discharged quickly upon arrival at the discharge passage, if desired.

While the present invention has been illustrated and described with particularity as embodied in one of its forms, the invention is not limited to the structural details thus illustrated and described, but covers all forms and arrangements which come within the terms employed in the definitions of the invention constituting the appended claims.

What is claimed as new is:

1. In combination, a furnace, a retort in the furnace, a stepped-panel beside the retort for receiving clinkers and ashes therefrom, each step of said panel comprising a movable section, and means for moving said sections one at a time in the direction of the length of the panel so as to shift the panel bodily in the direction of its length.

2. In combination, a furnace, a retort in the furnace, a stepped-panel beside the retort for receiving clinkers and ashes therefrom, each step of said panel comprising a movable section, and means for moving said sections one at a time in the direction of the length of the panel and for returning the sections together.

3. In combination, a furnace, a retort in the furnace, there being a discharge passage for clinkers and ashes at one side of the furnace, a stepped-panel beside the retort for receiving clinkers and ashes therefrom and carrying them to said discharge passage, each step of said panel comprising a movable section, and means for moving said sections one at a time and while the others remain stationary a limited distance toward said discharge passage.

4. In combination, a furnace, a retort in the furnace, there being a discharge passage for clinkers and ashes at one side of the furnace, a stepped-panel beside the retort for receiving clinkers and ashes therefrom and carrying them to said discharge passage, each step of said panel comprising a movable section, and means for moving said sections one at a time a limited distance toward said discharge passage and leaving each section in the position into which it has been shifted until the succeeding sections have all been shifted.

5. In combination, a furnace, a retort in the furnace, a support beside the retort for receiving clinkers and ashes therefrom, there being a discharge passage for clinkers and ashes between said support and one of the walls of the furnace, said support containing upwardly-projecting members arranged at various distances from said discharge passage and each movable a limited distance from and toward the discharge passage, and means for moving each of said members toward said discharge passage while the other members remain stationary.

6. In combination, a furnace, a retort in the furnace, a support beside the retort for receiving clinkers and ashes therefrom, there being a discharge passage for clinkers and ashes between said support and one of the walls of the furnace, said support containing upwardly-projecting members arranged at various distances from said discharge passage and each movable a limited distance from and toward the discharge passage, and leaving each member in the position into which it has been moved until the succeeding members have also been moved toward said passage.

7. In combination, a furnace, a retort in the furnace, a support beside the retort for receiving clinkers and ashes therefrom, there being a discharge passage for clinkers and ashes between said support and one of the walls of the furnace, said support containing upwardly-projecting members arranged at various distances from said discharge passage and each movable a limited distance from and toward the discharge passage, and means for moving them in succession toward said discharge passage and away from the discharge passage in unison with each other.

8. In combination, a furnace, fuel-supporting means in the furnace comprising a stepped panel, each step of said panel comprising a movable section, and means for moving said sections one at a time in the direction of the length of the panel while the others are stationary so as to shift the panel bodily in the direction of its length.

9. In combination, a furnace, fuel-supporting means in the furnace comprising a stepped panel, each step of said panel comprising a movable section, and means for moving said sections one at a time in the direction of the length of the panel so as to shift the panel bodily in the direction of its length and for returning the sections together.

In testimony whereof, we sign this specification in the presence of two witnesses.

WILLIAM JOHN KENNEY.
HENRY PHILLIP GROHN.

Witnesses:
GEORGE W. BONNELL,
MARGARET FALAHEE.